(12) United States Patent
Powell

(10) Patent No.: US 6,386,227 B1
(45) Date of Patent: May 14, 2002

(54) NON-FLOWING PILOT VALVE

(75) Inventor: Walter W. Powell, Sugar Land, TX (US)

(73) Assignee: Flow Safe, Inc., Orchard Park, NY (US)

( * ) Notice: Subject to any disclaimer, the term of this patent is extended or adjusted under 35 U.S.C. 154(b) by 0 days.

(21) Appl. No.: 09/661,799

(22) Filed: Sep. 14, 2000

Related U.S. Application Data
(60) Provisional application No. 60/153,664, filed on Sep. 14, 1999.

(51) Int. Cl.$^7$ .................. G05D 16/00; F16K 31/124
(52) U.S. Cl. .................. 137/492; 137/102; 137/488
(58) Field of Search .................. 137/492, 488, 137/492.5, 102

(56) References Cited

U.S. PATENT DOCUMENTS

| | | | | |
|---|---|---|---|---|
| 3,881,505 A | * | 5/1975 | Dunkelis | 137/375 |
| 4,316,598 A | * | 2/1982 | Maggio | 137/492 |
| 4,355,657 A | * | 10/1982 | Reip | 137/492 |
| 4,390,041 A | * | 6/1983 | Reip | 137/488 |
| 4,402,341 A | | 9/1983 | Reip | |
| 4,586,533 A | | 5/1986 | Estes | |
| 4,609,008 A | | 9/1986 | Anderson, Jr. et al. | |
| 4,609,088 A | * | 9/1986 | Anderson, Jr et al. | 137/488 |
| 4,682,495 A | | 7/1987 | McNeely | |
| 4,848,397 A | * | 7/1989 | Bickford et al. | 137/509 |
| 4,865,074 A | * | 9/1989 | Bickford et al. | 137/489 |
| 4,870,989 A | * | 10/1989 | Bickford et al. | 137/489 |
| 5,027,852 A | * | 7/1991 | McNeely | 137/488 |
| 5,590,684 A | * | 1/1997 | Alberts et al. | 137/489 |
| 5,950,657 A | * | 9/1999 | Lai et al. | 137/102 |
| 6,209,577 B1 | * | 4/2001 | Lai et al. | 137/489.5 |

* cited by examiner

Primary Examiner—John Rivell
Assistant Examiner—Meredith H. Schoenfeld
(74) Attorney, Agent, or Firm—Gary L. Bush; Andrews, Kurth, Mayor, Day, Caldwell & Keeton, LLP

(57) ABSTRACT

A non-flowing pilot valve is disclosed having a sense piston assembly (16) and a feedback sleeve (40) co-axially mounted within a valve body (12). A dome-line chamber (32) and an exhaust-line chamber (34) are isolated from each other by a feedback sleeve top shoulder (48) contacting a pop seal (52) on the valve body (12) below set pressure. At a few percentage points of inlet (19) pressure below set pressure, a reseat seal of a foot (20) portion of the sense piston (16) contacts the bottom shoulder (48) of the feedback sleeve (40) thereby closing off the dome-line chamber (32) from below and above and "locking in" dome line pressure. An increase in inlet (19) pressure above set pressure causes the sense piston (16) to move up simultaneously carrying feedback sleeve (40) with it thereby opening the dome-line chamber (32) to the exhaust-line chamber (34) below the open top shoulder (48).

14 Claims, 2 Drawing Sheets

NON-FLOWING PILOT VALVE

CROSS REFERENCE TO PREVIOUS APPLICATION

This Non-Provisional Application claims priority from Provisional Application No. 60/153,664 filed on Sep. 14, 1999.

BACKGROUND OF THE INVENTION

1. Field of the Invention

This invention concerns a pilot valve for controlling a main valve in a main flow line or pressure vessel and in particular to a pilot valve which is non-flowing during normal operation.

2. Description of the Prior Art

A non-flowing pilot valve does not provide direct fluid communication between its inlet or sensing chamber and an outlet fluid chamber, because a pilot "dome-line" chamber is either (1) connected to the inlet chamber and the dome-line to the dome in the main valve, (2) is blocked to both, or (3) is connected to the dome of the main valve. The inlet or "sensing" chamber has a pressure sensing element such as a piston or a diaphragm therein. The main valve, which may be a pressure relief or throttling control valve, normally has a dome with a pressure responsive member therein, such as a diaphragm or piston, which is responsive to fluid pressure from the dome-line chamber of the pilot valve. The dome-line chamber is never in simultaneous fluid communication with both the inlet or sensing chamber and exhaust-line. Thus, in a non-flowing pilot valve, there is no continuous fluid flow through the pilot valve from a bypass line extending from the main flow line, because the inlet or supply line and exhaust-line to the pilot valve are never in simultaneous fluid communication with the pilot dome-line chamber.

U.S. Pat. Nos. 4,682,495 and 4,609,008 illustrate the principles of operation of a non-flowing pilot valve.

The elimination of a continuous fluid flow through the pilot valve removes many of the problems in pilot valves having a continuous fluid flow such as, for example, the clogging of orifices and the like with entrained foreign matter in the flowing fluid, or icing resulting from wet gas applications. While a relatively small amount of fluid may be transmitted intermittently through the non-flowing pilot valve during operation, such amount is insignificant.

Such a non-flowing pilot valve is highly sensitive or responsive to changes in the sensed fluid pressure. The responsiveness of the non-flowing pilot valve to pressure changes in a sensed fluid is relatively constant over its operating range. A non-flowing pilot valve has a fast response to pressure changes in the sensed fluid.

3. Identification of the Object of the Invention

A primary object of the invention is to provide an improved non-flowing pilot valve as compared to prior art non-flowing pilot valves.

Another object of the invention is to provide an improved non-flowing pilot valve which has direct pop seal loading by the set pressure spring to a few percentage points below set pressure so as to provide improved seating through high seat loading.

Another object of the invention is to provide an improved non-flowing pilot valve that has a substantial reduction in part count by providing an assembly of a sense piston and a feedback sleeve, such that reduction in part count results in reduced manufacturing cost, enhanced reliability, simplicity of initial assembly and field service.

SUMMARY OF THE INVENTION

The objects of the invention identified above as well other advantages and features of the invention are incorporated in a non-flowing pilot valve having a body with two assemblies. A sense piston assembly is positioned within a cavity of the body and co-axially with the longitudinal axis of the body. A feedback sleeve is positioned co-axially about a neck region of the sense piston. The sense piston and feedback sleeve are free to move axially relative to each other and to the body.

A sense chamber is defined in the body, and a piston head of the sense piston, free to move axially in the sense chamber, is forced downward by a set pressure spring, but moves upward in response to inlet pressure through the piston via passages to the sense chamber. A pop seal carried by the body is disposed axially between an exhaust-line chamber and a dome-line chamber. The feedback sleeve includes a top shoulder, such that below set pressure, the top shoulder engages the pop seal to close a flow path from the dome-line chamber to the exhaust-line chamber. The feedback sleeve also includes a bottom shoulder located at the bottom of the dome-line chamber, and a foot portion of the sense piston carries a reseat seal. The passages in the piston communicate via cross bores to a space beneath the feedback sleeve bottom shoulder and above the reseat seal. Under inlet pressures substantially below set pressure, the space between the bottom shoulder of the feedback sleeve and the reseat seal remains open, such that the dome-line chamber pressure is the same as inlet pressure. As inlet pressure approaches a few percentage points of set pressure, e.g., 98% of set pressure, the sense piston moves up a small axial distance while opposing the force of the set pressure spring, and the reseat seal of the foot of the sense piston contacts the bottom shoulder of the feedback sleeve, thereby "locking in" that pressure in the dome-line chamber. A seating spring maintains tightness in both pop and reseat seals. As supply pressure rises further towards set pressure, the sense piston assembly directly lifts the feedback sleeve causing the pop seal to open or separate from the top seat or shoulder. Dome chamber pressure is reduced as its pressurized fluid flows to the exhaust chamber across the pop seat.

Closure is the reverse of opening. As supply pressure decays, lifting force is reduced, the piston moves down and the feedback sleeve moves down thereby closing the top shoulder on the pop seal between the exhaust-line chamber and the dome-line chamber. A short time later, the reseat seal moves below the bottom shoulder of the feedback sleeve, thereby admitting inlet pressure into the dome chamber. This increase in dome pressure, acting on differential areas between the dome chamber and the inlet area, increases lifting force on the piston, and it again moves up, and the reseat seal of the piston again seats on the bottom shoulder of the feedback sleeve again "locking in" dome pressure.

The non-flowing pilot valve of the invention is designed with effective cross section areas or diameters A1 (of the sense chamber), A2 (of the pop seal or of the reseat seal), and A3 (of the inlet area) such that a feedback ratio, $F=A1/A2-A3$, is a characteristic of the level of sensitivity for the spring of the pop seal and the closing of the reseat seal. A feedback ratio in the range of 5 to 10 for the non-flowing pilot valve and the provision of a seating spring between the piston and the feedback sleeve are features which reduce simmer or leakage of the valve before opening and closing.

BRIEF DESCRIPTION OF THE DRAWINGS

The objects, advantages and features of the invention will become more apparent by reference to the drawings which are appended hereto and wherein an illustrative embodiment of the invention is shown, of which.

DESCRIPTION OF TH INVENTION

Figure 1:
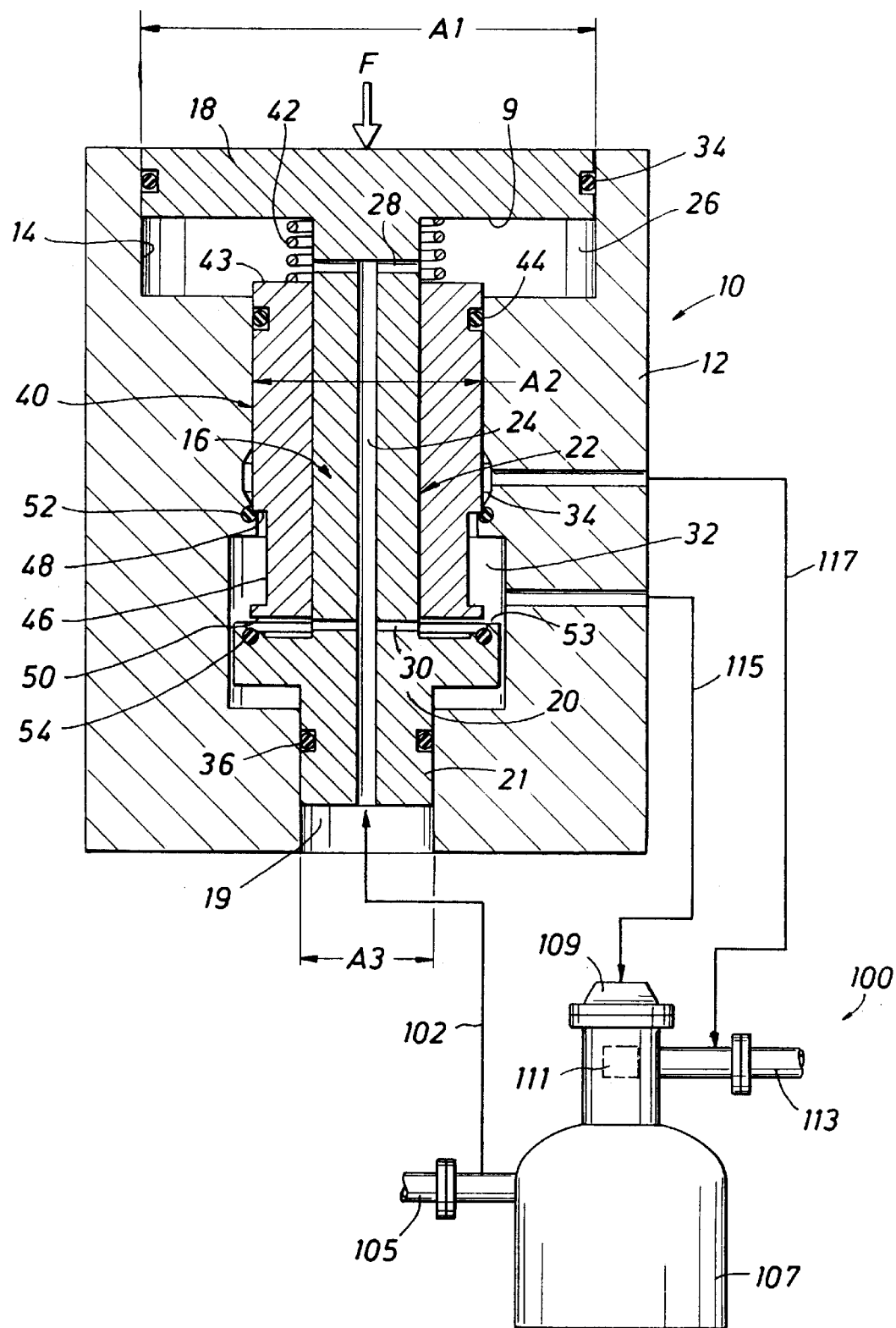
FIG. 1 is a schematic illustration of the non-flowing pilot valve of the invention when it is connected for control of excessive pressure of a pressure vessel or flowline; and, FIG. 2 is a cross-section of the non-flowing pilot valve showing its assembled parts suitable for manufacturing.

The pilot valve is illustrated schematically at 10 in FIG. 1 in cooperation with a main valve illustrated schematically at 100. An inlet or supply line conduit 102 is fluidly connected between a main flowline 105 and an inlet 19 of the pilot valve 10. The main flowline 105 leads to a pressure vessel 107 which has a dome 109 and a pressure responsive element 111 such as a piston or diaphragm normally positioned in cooperation with dome 109 for controlling flow of fluid through main valve 100 to outlet line 113.

A dome conduit or line 115 is fluidly connected between the dome 109 of main valve 100 and a dome-line chamber 32 of pilot valve 10. An exhaust-line 117 is fluidly connected between the exhaust outlet line 113 of main line valve 100 and an exhaust port or chamber 34 of pilot valve 10. The valve body 12 includes a bore 14 in which a pressure sensitive element such as a diaphragm or sense piston 16 is free to reciprocate against the force (as indicated by downward arrow F) of a set spring within a bonnet (not illustrated) at the top of a piston head 18. The piston 16 includes the piston foot 18, a piston foot 20, and a neck structure 22 which connects piston head 18 with piston foot 20. A fluid passage 24 runs through the neck 22 from the foot 20 and inlet 19 to a sense chamber 26 beneath the piston head 18. Cross bores 28, 30 connect the neck passage 24 to the sense chamber 26 and to a dome-line chamber 32. Sealing devices such as head "O" ring 34 and foot "O" ring 36 allow vertical movement of the sense piston 16 with respect to the body 12 of the valve 10 while preventing pressurized fluid from passing between the sense piston 16 and the body 12 to the exhaust chamber 34 or the dome-line chamber 32.

A feedback sleeve 40 is positioned co-axially around the neck 22. A seating spring 42 is placed between a bottom surface 9 of the piston head 18 and a top surface 43 of the feedback sleeve. A sleeve sealing device such as "O" ring 44 prevents pressurized fluid from passing between the outer surface of feedback sleeve 40 and the body 12.

The feedback sleeve 40 has an annular groove 46 formed at its lower end which defines two downward facing shoulders or seats: a top shoulder or seat 48 and a bottom shoulder or seat 50. A top sealing element 52, for example an "O" ring seal, is placed in a groove of the body at the top of the dome-line chamber 32. The top "O" ring seal 52 is arranged and designed to engage top shoulder 48 of feedback sleeve 40, during below set pressure operations, so as to seal off fluid communication between exhaust-line chamber 34 and dome-line chamber 32.

A bottom sealing element 54, for example another "O" ring seal, is placed in a groove at the top end 53 of the foot 20 of the sense piston 16. The bottom "O" ring seal 54 is arranged and designed not to engage bottom shoulder 50 during pressures more than a few percentage points below set pressure, so as to provide fluid communication from cross bore 30 and beneath bottom shoulder 50 of feedback sleeve 40 to dome-line chamber 32.

Pressurized supply fluid is applied from the main flow line 105 of pressure vessel 107 and via conduit 102 to inlet space 19 beneath the foot 20 of the sense piston 16. Such supply line fluid communicates with the sense chamber 26 and the dome-line chamber 32 when the supply line pressure is below set pressure (as determined by the pilot spring force F). As explained above, the feedback sleeve is positioned, substantially below set pressure conditions, such that top seal 52 seals against top shoulder 48, and the bottom shoulder 50 is separated from and spaced above bottom seal 54. As a result, the dome-line chamber 32 communicates with the pressure of the main flow fine 105 via line 102, passage 24 and cross bore 30 and also communicates with the dome 109 of the main valve 100 via the dome-line 115. When the supply line 102 pressure is more than a few percentage points below set pressure of the pilot valve, that same pressure exists in the dome-line chamber 32 (and of course in the dome-line 115 and above the dome 109 of the main valve 100). In that condition, the pressure response element 111 of the main valve 100 causes the main valve 110 to close. No pressurized fluid exists in the exhaust-line 117, and the valve is non-flowing as a result.

In the condition illustrated in FIG. 1, dome-line chamber 32 pressure is prevented from escaping to the exhaust-line 117 by seal 52 being seated on shoulder or seat 48 of the feedback sleeve 40. With the supply line 102 pressure substantially below set pressure, the reseat seal 54 does not close on bottom shoulder 50, and supply line 102 pressurized fluid passes to the dome-line chamber 32 and to the dome 109 of the main valve 100. This is the condition of FIG. 1 which shows the reseat seal 54 and seat or shoulder 50 in an open position. The sliding "O" ring 44 seal on the feedback sleeve 40 also prevents leakage of pressurized fluid from the sense chamber 26 to the exhaust chamber or port 34. A small seating spring 42 pushes down on the feedback sleeve 40 with respect to the sense piston head 18, thereby ensuring seating of the pop seal 52 against top shoulder or seat 48 after reseat seal 54 is closed and before set pressure is applied. A normal set pressure spring forces the sense piston head 18 down as indicated by the arrow labeled "F". As mentioned above, the sense piston 16 carries the reseat seal 54 and the smaller "foot" piston 20 having an area A3 at its base 21. Below set, supply line 102 pressurized fluid is present at the inlet 19 below the piston foot 20, in the dome-line chamber 32, and in the sense chamber 26 where the pressurized fluid acts on the head 18 of the sense piston 16. In that condition below set, the lifting force is simply the product of the sense area A1 times the pressure of the inlet line 102 that is, the supply pressure.

As supply line pressure rises, the sense piston 16 moves up opposing the downward force F of the set pressure spring and is arranged and designed, at a few percentage points under set pressure, to lock in the supply line pressure in the dome-line chamber 32 by closing the reseat seal 54 against the bottom shoulder or seat 50 of the feedback sleeve 40. In other words, the piston 16, with its foot 20 moves upward with respect to the feedback sleeve 40, and the reseat seal 54 engages bottom shoulder 50. The feedback sleeve 40 at this point does not move upward with respect to body 12, because it is seated by bias from the seating spring 42, so the pop seal 52 remains in sealing contact with shoulder or seat 48. As a result, the dome-line chamber pressure is "locked in".

With a further rise in supply line pressure, the sense piston 16 rises a greater height, with the reseat seal 54 pushing upward on the bottom shoulder 50 of the feedback sleeve 40. The seating spring 42 compresses somewhat, and the feedback sleeve 40 moves up so that top shoulder or seat 48 on feedback sleeve 40 unseats from the pop seal 52 on the body 12. Now a passage exists from the dome-line chamber 32 to the exhaust chamber 34 and exhaust-line 117 which vents the dome 109 pressure of the main valve 100 to the outlet line 113 (or to atmosphere if no closed outlet line is required).

As the pressure in the dome-line chamber 32 is reduced via the exhaust-line 117, the lifting force acting on differential area A2–A3 is reduced as the dome pressure decays. As a result, the reseat seal 54 is no longer forcing the feedback sleeve 40 up, and the seating spring 42 causes the feedback sleeve 40 to move down with the top shoulder 48 reseating on the pop seal 52. As supply pressure decreases further, reseat seal 54 opens and the dome-line chamber 32 is again in communication with bore 30 and the inlet 19 as pressure drops.

In other words, when the supply line pressure is substantially below set, the dome-line chamber 32 pressure is the same as supply line 102 pressure. When the supply line 102 pressure is only a few percentage points below set pressure, the pressure of dome-line chamber 32 is "locked in", because the reseat seal 54 and the bottom seat or shoulder 50 are in contact, as are the pop seal 52 and the top seat or shoulder 48. Increased supply line 102 pressure causes the pilot valve 10 to open by pushing the feedback sleeve 40 up, opening sleeve top seat shoulder 48 with respect to body pop seal 52 and exhausting dome-line 32 pressure via the exhaust chamber 34 and line 117.

As supply pressure decays, the upward force on the feedback sleeve 40 decays, and the pop seal 52 and top seat or shoulder 48 contact again, thereby closing off the exhaust chamber 34. The set pressure spring force F causes the sense piston 16 to move down with respect to the feedback sleeve 40, because the feedback sleeve 40 is constrained from further downward movement by the pop seal 52 on body 12 contacting seat or shoulder 48. In other words, the sense piston 16 can move further down than can the feedback sleeve 40, because the sleeve 40 is stopped by the pop seal 52 on body 12. As a result, the reseat seal 54 on piston 16 moves down below the bottom of shoulder 50, and supply line 102 pressure flows again via passage 24 and cross bore 30 into the dome-line chamber 32. The supply line pressure in the dome-line chamber 32, acting on differential area A2–A3 forces the piston 16 upward, thereby closing the reseat seal 54 against shoulder or seat 50 and again locking in the dome-line chamber 32 pressure.

An important feature of the pilot valve 10 of FIG. 1 is that the sense piston 16 and the feedback sleeve 40 operate independently below set pressure and together (as one piece) above set pressure. This fact requires that the effective sealing area for the pop seal 52, the reseat seal 54, and the feedback piston 16 seal ("O" ring 44) are all substantially the same area, e.g., area A2 for best performance. The above description shows that in operation, the dome-line chamber 32 is locked in just below set pressure, and is reduced at set pressure with the dome-line chamber 32 pressure being inversely proportional to overpressure. The dome-line chamber 32 is again "locked in" with supply line pressure after decay.

Another feature of the pilot valve 10 in FIG. 1 is that substantially the same degree of feedback force is necessary on both the pop seal 52 and the reseat seal 54.

Figure 2:
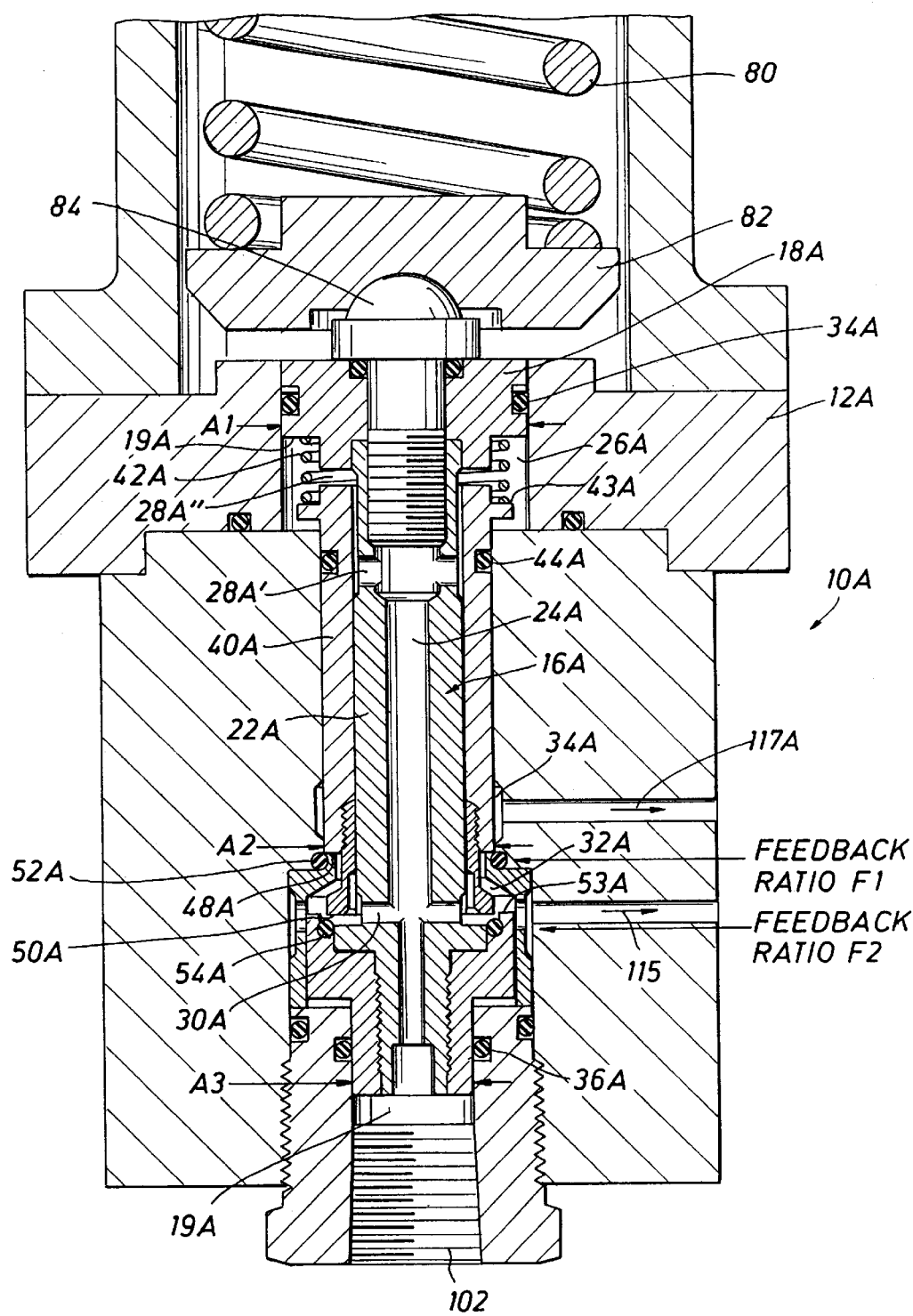

FIG. 2 is an illustration of a preferred embodiment of a medium pressure (285–1485 psi) pilot valve 10A according to the invention where a sense piston head 18A is used as a sense element for the sense piston 16A. A set spring 80 and spring follower 82 provides a downward set force to piston 18A by contact with upper end 84 of piston head 18A. The reference numbers of the parts of the embodiment of FIG. 2 correspond to those of FIG. 1, but the letter "A" is added to the reference number to indicate the preferred embodiment.

Feedback ratios for the preferred embodiment of FIG. 2 are indicated at the lifting areas of the pilot valve 10A. Feedback ratios F1 and F2 are representative of the sensitivity of the opening and closing of pilot valve 10A at the opening of pop seal 52A(F1) and at the closing of reseat seal 54A F2). A feedback ratio F is defined as, $$F = \frac{\text{Lifting Area Exposed to Pressure Below Set Pressure}}{(\text{Lifting Area Exposed to Dome} - \text{Line Pressure Above Set Pressure})}$$

The numerical value of the feedback ratio F is not so important as having the same feedback ratio F on both the pop seal 52 and the reseat seal 54. For both seals, the ratio is $$F = \frac{A1}{(A2 - A3)}$$

The small seating spring 42A provided maintains pop seal 52A tightness after load from the set spring 80 is lost as inlet supply line pressure rises, typically above approximately 90% of set. Below 90% of set, set spring force is carried directly through the feedback sleeve 40A to the pop seal 52A overtravel stop thereby providing high seat load that enhances seat tightness.

The piston head 18A may be replaced with a diaphragm as a pressure sensing element in a low pressure non-flowing pilot valve embodiment of the invention.

The non-flowing pilot valve 10A of FIG. 2 includes two assemblies. A sense piston assembly 16A, which includes a piston head 18A, piston neck 22A and piston foot 20A, which is positioned co-axially within body 12A. The feedback sleeve 40A is positioned co-axially about the piston neck 22A and within body 12A Providing only two assemblies enables a reduction in total parts required as compared to prior non-flowing pilot valves with advantages of cheaper costs, enhanced reliability, easier assembly, etc.

In the preferred embodiment of the invention, the pop seal 52A, reseat seal 54A and the feedback sleeve seal 44A all are placed at generally the same diameter so that the effective areas on which pressure in the valve is present in approximately the same. A large diameter (e.g., A2 in FIG. 2) for the pop seal 52A and for the reseat seal 54A is preferred so that significant flow with minimal axial lift or movement is developed. This feature maximizes main valve 100 (see FIG. 1) response while minimizing pilot valve 10A dead band.

The arrangement of the invention as illustrated in FIGS. 1 and 2 is advantageous in that the reseat seal 54A, carried by the sense piston assembly 16A, directly closes against bottom shoulder 50A, with upward motion of the sense piston assembly 16A. Furthermore, the feedback sleeve 40A is directly lifted by the upward motion of the sense piston 16A, thereby directly opening or closing the pop seal 52, top shoulder 48 valve as required.

Another advantageous feature of the invention in the arrangement of FIGS. 1 and 2 is that when exhaust chamber 34A is opened to dome-line chamber 32A, the pressure in the exhaust chamber 34A has no effect on valve 10A operations, because complete balance is achieved at the pop seal 52A and the reseat seal 54A, both of which are exposed to exhaust chamber 34A pressure, because both the pop seal 52A and the reseat seal 54A have the same effective area A2.

Another advantageous feature of the invention in the arrangement of FIGS. 1 and 2 is that the feedback ratio, F=A1/A2−A3, can easily be selected by adjusting the diameters A1, A2, and A3 to achieve a desired level of sensitivity for the opening of the pop seal 52A and the closing of reseat seal 54A. The area A3 below the foot 20A of the piston assembly 16A is an integral part of the inventive arrangement, because that area A3, when subtracted from the area A2 defined by the diameter of either the pop seal 52A or the reseat seal 54A, develops feedback to secure the desired non-flowing modulating actions of the pilot valve as dome 109 pressure is reduced. It is preferred to provide a feedback ratio F in a range of 5 to for the arrangement of FIG. 2. Such a range is preferred over a higher range such as 16 to 20 because of an enhanced improvement of seating of pop seal 52 and reseat seal 54. Enhanced seating occurs because as inlet 12 pressure increases to set pressure, the dome pressure is locked in as the reseat seal 54 closes. As inlet pressure rises further, the pop seal 52 opens thereby reducing dome pressure. With reduced dome pressure, lifting force is reduced and the pop seal 52 closes again. This has the effect of improving seating which significantly reduces "simmer" or "leakage" before opening and closing.

Another advantageous feature of the invention in the arrangement of FIGS. 1 and 2 is that the seating spring 42A co-acts with both the feedback sleeve 40 and the sense piston 16A.

Another advantageous feature of the invention in the arrangement of FIGS. 1 and 2 is that it can be designed such that when supply pressure via line 102 is more than 98% of set pressure (as defined by downward force of set pressure spring 80) and pressure is constant (that is not raising or lowering), both that pop seal 52A and the reseat seal 54A are closed, and as a result, there is zero flow through the pilot valve and dome pressure in dome-line chamber 32A is constant or "locked in".

Another advantageous feature of the invention in the arrangement of FIGS. 1 and 2 is that it can be designed such that when supply pressure via line 102 is approximately 90% or less of set pressure, the set pressure spring 80 load is transferred directly from the sense piston assembly 16A to the feedback sleeve 40A and is reacted on the on the pop seal 52A against the top shoulder 48A. Therefore at low pressures of line 102, the seating of the pop seal 52A against the top shoulder 48A is enhanced because a large seating load is established.

Another advantageous feature of the invention in the arrangement of FIGS. 1 and 2 is that the seating spring 42A acts to energize the pop seal 52 after the sense piston assembly 16A has moved away from its down stop. As a result, it directly provides seating force to the reseat seal 54 during the null position of the pilot valve 10A.

What is claimed is:

1. A pilot valve (10) comprising,
    a valve body (12), and a sense chamber (26), an exhaust-line chamber (34) and a dome-line chamber (32) defined in said valve body (12), said exhaust-line chamber (34) being axially positioned between said sense chamber (26) and said dome-line chamber (32),
    a sense piston (16) having a foot (20), a neck (22) and a head (18), with said head (18) disposed in and slidable with respect to said sense chamber (26), with said foot disposed below said exhaust-line chamber (34) and said dome-line chamber (32), said sense piston (16) having an axial passage (24) from a supply inlet (19) of said foot (20) to a top radial passage (28), which opens to said sense chamber (26), and a lower radial passage (30),
    a set spring (80) coupled between said body (12) and said head (18) which is arranged and designed to provide a downward force to said head (18) representative of set pressure,
    a feedback sleeve (40) disposed about said neck (22), said feedback sleeve (40) being resiliently coupled to said sense piston; said feedback sleeve (40) having a lower end with a top annular shoulder (48) and a bottom annular shoulder (50),
    said body (12) carrying an annular pop seal (52) at an axial position between said dome-line chamber (32) and said exhaust-line chamber (34),
    said foot (20) carrying an annular reseat seal (54) at an axial position beneath said dome-line chamber (32),
    said annular pop seal (52) being arranged and designed in cooperation with said top annular shoulder (48) of said feedback sleeve (40) to open or to close fluid communication between said dome-line chamber (32) and said exhaust-line chamber (34), and
    said annular reseat seal (54) being arranged and designed in cooperation with said bottom annular shoulder (46) to open or to close fluid communication between said lower radial passage (30) and dome-line chamber (32).

2. The pilot valve of claim 1 further comprising,
    a feedback sleeve seal (44) disposed between an outer peripheral surface of said feedback sleeve (40) and said body (12) at a position between said sense chamber (26) and said exhaust-line chamber (34).

3. The pilot valve of claim 1 wherein,
    said pop seal (52) and said reseat seal (54) are placed at generally the same diameter (A2) so that the effective areas at said seals at which pressure in said valve is present is approximately the same.

4. The pilot valve of claim 2 wherein,
    said pop seal (52), said reseat seal (54) and said feedback sleeve seal (44) are placed at generally the same diameter (A2) so that the effective areas at which pressure in said valve is present is approximately the same.

5. The pilot valve of claim 1 wherein,
    a seating spring (42) couples said sense piston (16) to said feedback sleeve (40).

6. The pilot valve of claim 5 wherein,
    said neck (20) of said sense piston (16) has a top surface (43), said piston head (18) has a bottom surface (9), and said seating spring (42) is positioned between said top surface (43) and said bottom surface (9) for resiliently coupling axial movements of said sense piston (16) and said feedback sleeve (40).

7. The pilot valve of claim 1 wherein,
    the feedback sleeve (40) and the sense piston (16) are cooperatively arranged and designed so that at inlet (10) pressures of a few percentage points below set pressure, said annular reseat seal (54) of said piston (16) is lifted into contact with said bottom annular shoulder (50) of said feedback sleeve (40) while said pop seal (52) and said top annular shoulder (48) remain in sealing contact, thereby locking in dome line pressure in said dome-line chamber (32).

8. The pilot valve of claim 1 wherein,
    the feedback sleeve (40) and the sense piston (16) are cooperatively arranged and designed so that at inlet pressures above set pressure, said annular reseat seal (54) of said sense piston (16) is lifted into contact with said bottom annular shoulder (50) of said feedback sleeve (40) thereby directly opening said pop seal (52) top shoulder (48) and allowing pressurized fluid of said dome-line chamber (32) to flow to said exhaust-line chamber (34).

9. The pilot valve of claim 5 wherein, the feedback sleeve (40) and the sense piston (16) are cooperatively arranged and designed such that after said top shoulder (48) of the feedback piston (40) has been raised above said pop seal (52) and said dome-line chamber (32) has been exhausted to said, exhaust-line chamber (34), and after said inlet (19) pressure has dropped to less than a few percentage points below set pressure, said sense piston (16) and said feedback sleeve (40) move downwardly under the force of said set pressure spring (80) until said top shoulder (48) of said feedback sleeve (40) moves downward by seating spring bias to sealing contact with said pop seal (52) of said body (12) and said bottom shoulder (50) of said feedback sleeve (40) moves downward to sealing contact with reseat seal (54) thereby locking in dome line pressure in said dome-line chamber (32).

10. The pilot valve of claim 9 wherein, after said inlet (19) pressure has dropped to more than a few percentage points below set pressure, said sense piston (16) moves downwardly more than does said feedback sleeve (40) such that said reseat seal (54) of said sense piston (16) moves below sealing contact with bottom shoulder (50) of said feedback piston and inlet pressurized fluid from said inlet (19) flows to said dome-line chamber (32).

11. The pilot valve of claim 1 wherein, said pop seal (52) is placed at a diameter of dimension A2 with said body (12), said sense chamber (26) is formed at a diameter of dimension A1 within body (12) and said inlet (19) has a diameter of dimension A3 below said foot (20) of said sense piston (16), and said piston (16) and feedback sleeve (40) are characterized at said pop seal (52) by a feedback ratio F1 proportional to A1/A2−A3.

12. The pilot valve of claim 11 wherein, said reseat seal (54) is placed at a diameter of dimension A2 on said sense piston (16), said sense chamber (26) is formed at a diameter of dimension A1 within body (12), and said inlet (19) has a diameter of dimension A3 below said foot (20) of sense piston (16), and said piston (16) and feedback sleeve (40) are characterized at said reseat seal (54) by a feedback ratio F2 proportional to A1/A2−A3, such that the feedback ratios at said pop seal (52) and said reseat seal are generally the same.

13. The pilot valve of claim 11 wherein, said ratio F1 is in the range of 5 to 10.

14. The pilot valve of claim 12 wherein, said ratio F2 is in the range of 5 to 10.

\* \* \* \* \*